(12) United States Patent
Lee et al.

(10) Patent No.: US 8,524,401 B2
(45) Date of Patent: Sep. 3, 2013

(54) ELECTROLYTE FOR LITHIUM BATTERY AND LITHIUM BATTERY INCLUDING THE SAME

(75) Inventors: Yong-Beom Lee, Yongin-si (KR); Sun-Young Kim, Yongin-si (KR); Bo-Ra Lee, Yongin-si (KR); Sin-Young Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 349 days.

(21) Appl. No.: 12/875,872

(22) Filed: Sep. 3, 2010

(65) Prior Publication Data

US 2011/0117443 A1   May 19, 2011

(30) Foreign Application Priority Data

Nov. 19, 2009   (KR) ...................... 10-2009-0112197

(51) Int. Cl.
*H01M 6/16* (2006.01)
(52) U.S. Cl.
USPC ........... 429/328; 429/330; 429/322; 429/338; 429/199; 429/200; 252/62.2
(58) Field of Classification Search
USPC ................. 429/328, 330, 322, 338, 199, 200; 252/62.2
See application file for complete search history.

(56) References Cited

U.S. PATENT DOCUMENTS

| | | | |
|---|---|---|---|
| 7,476,468 B1 | 1/2009 | Lam et al. | |
| 2001/0010877 A1 | 8/2001 | Arai | |
| 2009/0130567 A1 | 5/2009 | Segawa | |

FOREIGN PATENT DOCUMENTS

| | | |
|---|---|---|
| JP | 09-097627 | 4/1997 |
| JP | 10-012272 A | 1/1998 |
| JP | 11-026015 | 1/1999 |
| JP | 11-307123 | 11/1999 |
| JP | 2000-294281 | 10/2000 |
| JP | 2001-210368 A | 8/2001 |
| JP | 2004-087136 | 3/2004 |
| JP | 2008-192504 | 8/2008 |
| JP | 2009-245828 A | 10/2009 |
| KR | 10-2007-0100827 A | 10/2007 |
| KR | 10-2008-0061866 A | 7/2008 |
| KR | 10-2009-0029569 A | 3/2009 |
| WO | WO 2009/028567 A1 | 3/2009 |

OTHER PUBLICATIONS

European Search Report dated Feb. 24, 2011, for corresponding European Patent application 10251948.5, noting listed references in this IDS.
Patent Abstracts of Japan, and English machine translation of Japanese Publication 2000-294281, listed above, 13 pages.
European Office action dated Apr. 24, 2012, for corresponding European Patent application 10251948.5, (7 pages).
Machine English Translation of JP 2001-210368 A.
Machine English Translation of JP 2009-245828 A.
KIPO Office Action dated Jun. 3, 2011 for KR Application No. 10-2009-0112197 (8 pages).
KIPO Notice of Allowance dated Jan. 18, 2012, listing the cited JP reference, as well as JP 2001-210368 and 2009-245828, both of which were cited in an IDS on Jul. 21, 2011, 5 pages.
Japanese Office action dated Sep. 18, 2012, for corresponding Japanese Patent application 2010-256515, (2 pages).
Patent Abstracts of Japan, and English machine translation of Japanese Publication 10-012272 listed above, (22 pages), Jan. 16, 1998.

*Primary Examiner* — Laura Weiner
(74) *Attorney, Agent, or Firm* — Christie, Parker & Hale, LLP

(57) ABSTRACT

An electrolyte for a lithium battery and a lithium battery including the electrolyte.

16 Claims, 12 Drawing Sheets

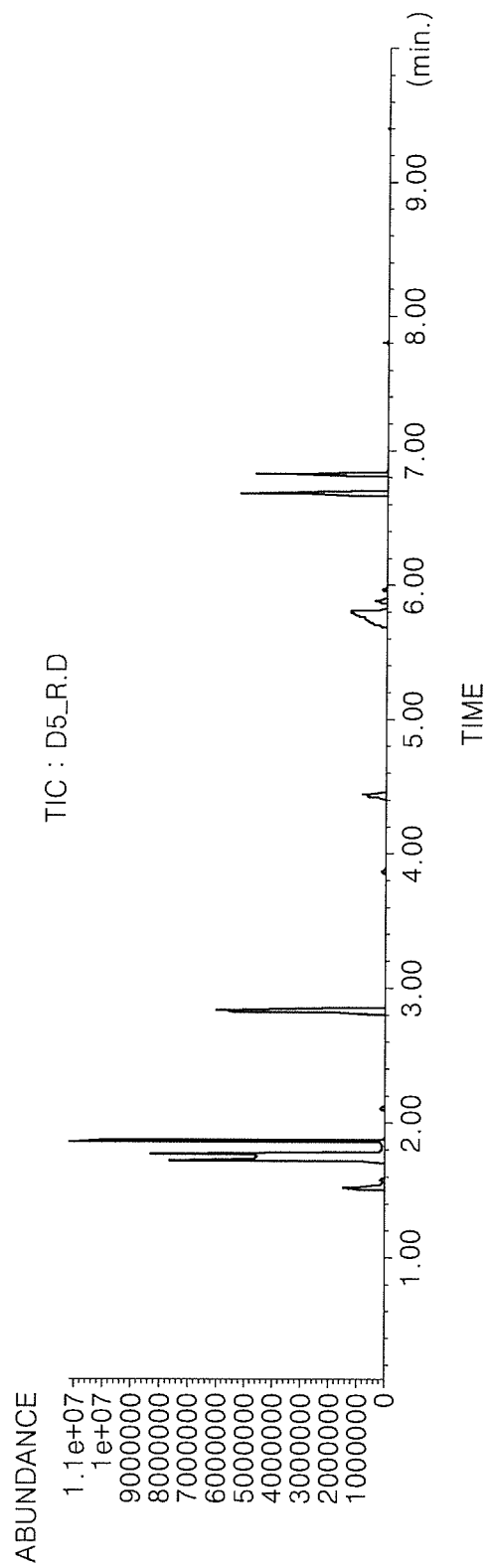

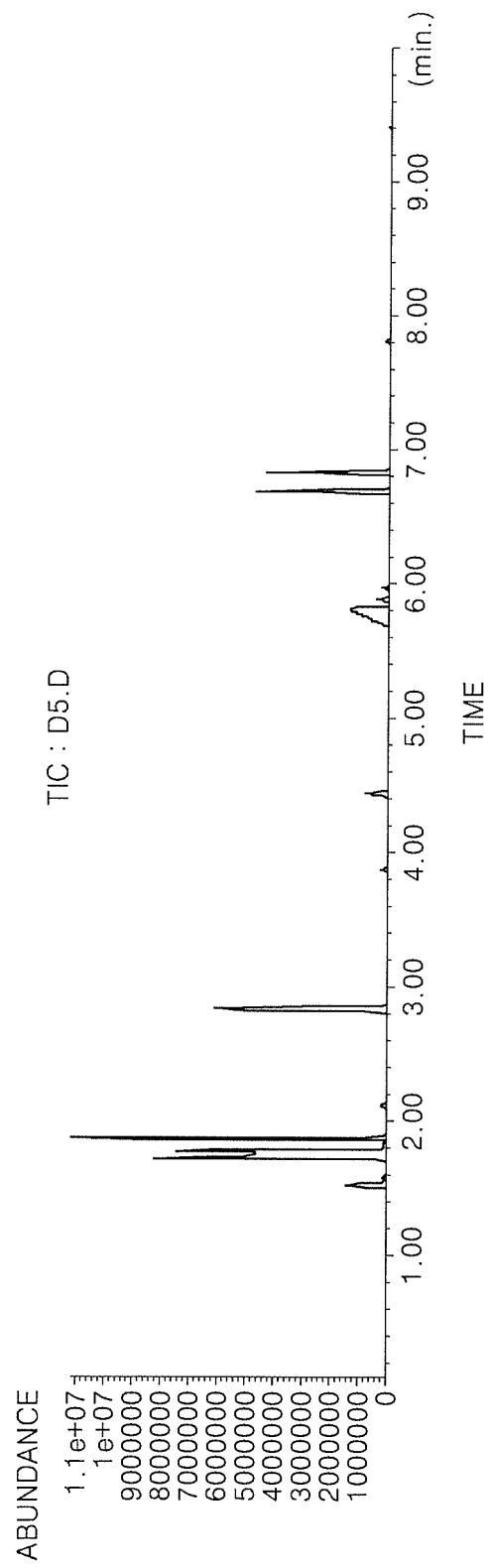

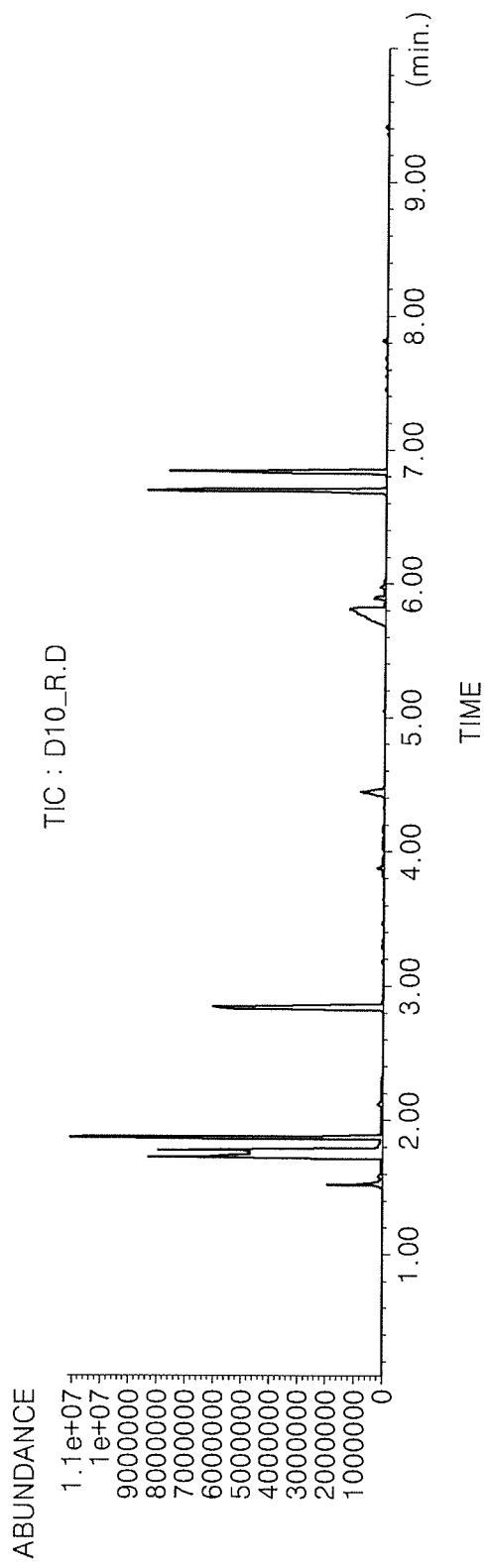

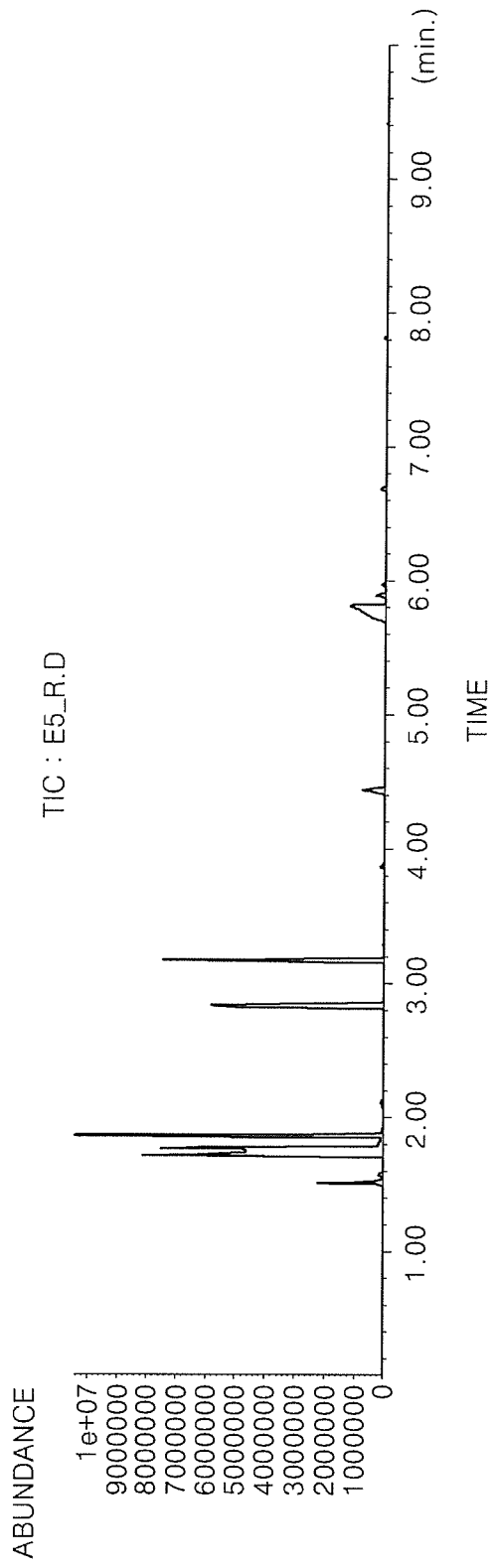

ELECTROLYTE FOR LITHIUM BATTERY AND LITHIUM BATTERY INCLUDING THE SAME

CROSS-REFERENCE TO RELATED APPLICATION

This application claims priority to and the benefit of Korean Patent Application No. 10-2009-0112197, filed on Nov. 19, 2009, in the Korean Intellectual Property Office, the entire content of which is incorporated herein by reference.

BACKGROUND

1. Field

The following description relates to an electrolyte for a lithium battery and a lithium battery including the electrolyte.

2. Description of Related Art

A lithium battery is one of the batteries that convert chemical energy generated by electrochemical redox reaction of chemical substances into electrical energy, and it includes a positive electrode, a negative electrode, and an electrolyte.

The lithium battery may be used as power source of various suitable electronic devices, wherein the electronic devices may be used in various suitable environments. For example, the electronic devices may be used in high-temperature environments or near a source of ignition. Thus, there is a need for the development of a lithium battery that can maintain electrical characteristics such as high capacity and high output power and maintain stability even when used not only at room temperature but also at a high temperature or near a source of ignition.

SUMMARY

An aspect of an embodiment of the present invention is directed toward an electrolyte for a lithium battery that is highly incombustible.

An aspect of embodiment of the present invention is directed toward a lithium battery including the electrolyte that is highly incombustible.

Additional aspects will be set forth in part in the description which follows and, in part, will be apparent from the description, or may be learned by practice of the presented embodiments.

According to one or more embodiments of the present invention, an electrolyte for a lithium battery includes: a nonaqueous organic solvent, a lithium salt, a first compound represented by Formula 1 below, and a second compound represented by Formula 2 below:

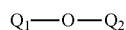

Formula 1

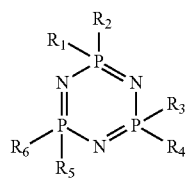

Formula 2 wherein, $Q_1$ is a $C_2$-$C_{30}$ alkyl group substituted with one or more —F;

$Q_2$ is a $C_1$-$C_{30}$ alkyl group, a $C_2$-$C_{30}$ alkenyl group, a $C_2$-$C_{30}$ alkynyl group, a $C_1$-$C_{30}$ alkyl group substituted with one or more —F, a $C_2$-$C_{30}$ alkenyl group substituted with one or more —F, or a $C_2$-$C_{30}$ alkynyl group substituted with one or more —F;

$R_1$ through $R_6$ in the second compound are each independently selected from the group consisting of —F and —$OT_1$, wherein $T_1$ is a $C_1$-$C_{30}$ alkyl group; a $C_2$-$C_{30}$ alkenyl group; a $C_2$-$C_{30}$ alkynyl group; a $C_6$-$C_{12}$ cycloalkyl group; a $C_5$-$C_{30}$ aryl group; a $C_1$-$C_{30}$ alkyl group substituted with at least one substituent selected from the group consisting of —F, a hydroxyl group, and a carboxyl group; a $C_2$-$C_{30}$ alkenyl group substituted with at least one substituent selected from the group consisting of —F, a hydroxyl group, and a carboxyl group; a $C_2$-$C_{30}$ alkynyl group substituted with at least one substituent selected from the group consisting of —F, a hydroxyl group, and a carboxyl group; a $C_6$-$C_{12}$ cycloalkyl group substituted with at least one substituent selected from the group consisting of —F, a hydroxyl group, and a carboxyl group; or a $C_5$-$C_{30}$ aryl group substituted with at least one substituent selected from the group consisting of —F, a hydroxyl group, and a carboxyl group, wherein a case where all $R_1$ through $R_6$ are —F or —$OT_1$ is excluded and the number ratio of fluorine atoms to hydrogen atoms in the first compound is 1 or above.

According to one or more embodiments of the present invention, a lithium battery includes: a negative electrode comprising a negative active material; a positive electrode comprising a positive active material; and the electrolyte described above.

BRIEF DESCRIPTION OF THE DRAWINGS

These and/or other aspects will become apparent and more readily appreciated from the following description of the embodiments, taken in conjunction with the accompanying drawings of which:

FIGS. 5A and 5B are graphs showing results of GC/MS analysis on an electrolyte included in a lithium battery of Example 1;

FIGS. 6A and 6B are graphs showing results of GC/MS analysis on an electrolyte included in a lithium battery of Example 2;

FIGS. 7A and 7B are graphs showing results of GC/MS analysis on an electrolyte included in a lithium battery of Example 4.

DETAILED DESCRIPTION

Figure 1:
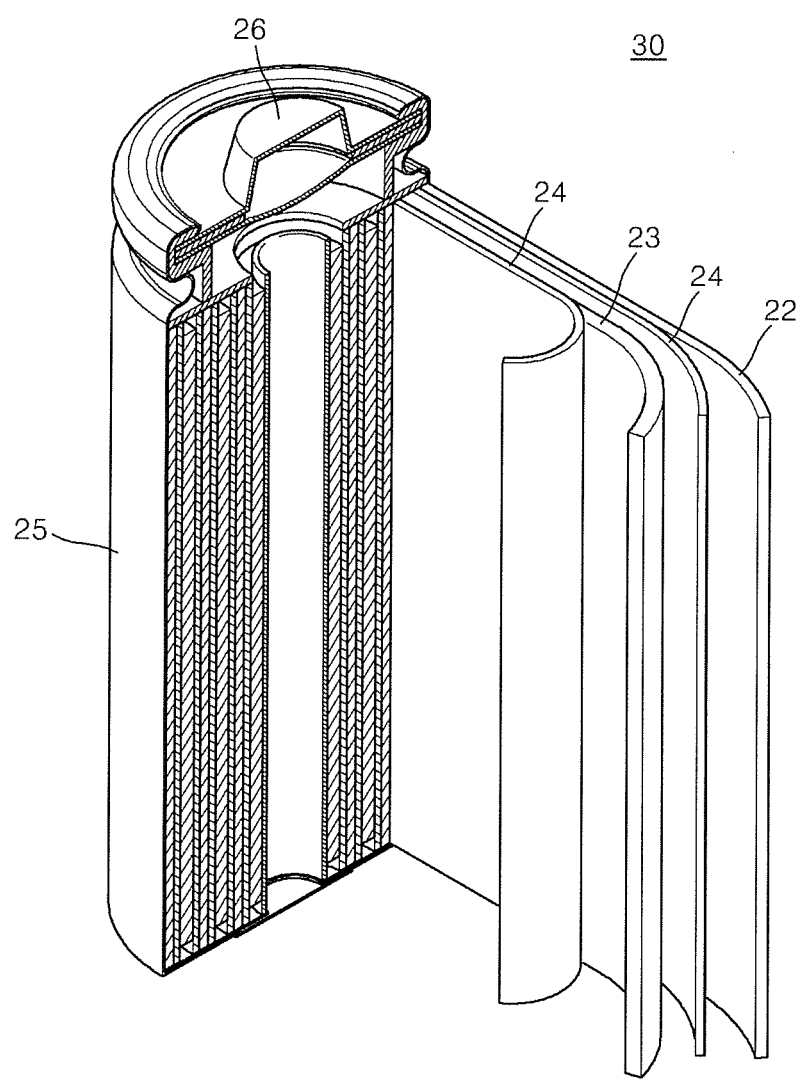
FIG. 1 is a schematic perspective view of a lithium battery according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

According to an embodiment of the present invention, an electrolyte for a lithium battery includes a nonaqueous organic solvent, a lithium salt, a first compound represented by Formula 1 below, and a second compound represented by Formula 2 below:

Formula 1
$$Q_1-O-Q_2$$

Formula 2
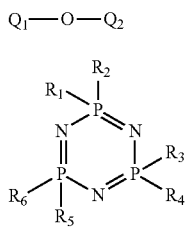

The first compound has relatively high incombustibility and relatively low reduction-decomposition reactivity and thus may maintain or improve an electrical characteristic of a lithium battery.

$Q_1$ in the first compound is a $C_2$-$C_{30}$ alkyl group substituted with one or more —F (fluorin).

For example, $Q_1$ in the first compound may be a linear or branched $C_2$-$C_{20}$ alkyl group substituted with one or more —F. Alternatively, $Q_1$ in the first compound may be a linear or branched $C_2$-$C_{10}$ alkyl group substituted with one or more —F. However, the present invention is not limited thereto.

$Q_2$ in the first compound may be a linear or branched $C_2$-$C_{20}$ alkyl group or a linear or branched $C_2$-$C_{20}$ alkyl group substituted with one or more —F. In addition, $Q_1$ in the first compound may be a linear or branched $C_2$-$C_{10}$ alkyl group or may be a linear or branched $C_2$-$C_{10}$ alkyl group substituted with one or more —F. However, the present invention is not limited thereto.

$Q_1$ and $Q_2$ in the first compound may each independently be a methyl group substituted with one or more —F, an ethyl group substituted with one or more —F, a propyl group substituted with one or more —F, a butyl group substituted with one or more —F, a pentyl group substituted with one or more —F, a hexyl group substituted with one or more —F, a heptyl group substituted with one or more —F, or an octyl group substituted with one or more —F, but are not limited thereto.

$Q_1$ and $Q_2$ in the first compound may each independently be selected from the group consisting of —$CF_2$—$CF_2H$, —$CH_2$—$CF_2$—$CF_2H$, —$CF_2$—$CF_3$, —$CH_2$—$CF_2$—$CF_3$, —$CF_2$—$CFH_2$, and —$CH_2$—$CF_2$—$CFH_2$, but are not limited thereto.

The number ratio of fluorine atoms to hydrogen atoms in the first compound may be about 1 or above (or not less than 1; or about 1 or more), for example, in the range of about 1 to about 20 (or of 1 to 20). The number ratio of fluorine atoms to hydrogen atoms in the first compound may be in the range of about 1 to about 10 (or of 1 to 10), for example, about 1 to about 5 (or 1 to 5), but is not limited thereto. The number ratio of fluorine atoms to hydrogen atoms in the first compound may be about 1 (or 1), about 1.5 (or 1.5), about 2 (or 2), about 2.5 (or 2.5), about 3 (or 3), about 3.5 (or 3.5), or about 4 (or 4), but is not limited thereto. If the number ratio of fluorine atoms to hydrogen atoms in the first compound is within the range described above, the first compound may have relatively high incombustibility.

The second compound may provide relatively high incombustibility to an electrolyte.

$R_1$ through $R_6$ in the second compound may each be independently selected from the group consisting of —F and —$OT_1$. $T_1$ may be a $C_1$-$C_{30}$ alkyl group a $C_2$-$C_{30}$ alkenyl group; a $C_2$-$C_{30}$ alkynyl group; a $C_6$-$C_{12}$ cycloalkyl group; a $C_5$-$C_{30}$ aryl group; a $C_1$-$C_{30}$ alkyl group substituted with at least one substituent selected from the group consisting of —F, a hydroxyl group and a carboxyl group; a $C_2$-$C_{30}$ alkenyl group substituted with at least one substituent selected from the group consisting of —F, a hydroxyl group and a carboxyl group; a $C_2$-$C_{30}$ alkynyl group substituted with at least one substituent selected from the group consisting of —F, a hydroxyl group and a carboxyl group; a $C_6$-$C_{12}$ cycloalkyl group substituted with at least one substituent selected from the group consisting of —F, a hydroxyl group, and a carboxyl group; or a $C_5$-$C_{30}$ aryl group substituted with at least one substituent selected from the group consisting of —F, a hydroxyl group, and a carboxyl group material.

$R_1$ through $R_6$ in the second compound are defined as above. However, a case where all $R_1$ through $R_6$ is —F or —$OT_1$ is excluded.

For example, $R_1$ through $R_5$ may be —F and $R_6$ may be —$OT_1$ in the second compound; or $R_1$, $R_2$, $R_4$, and $R_5$ may be —F and $R_3$ and $R_6$ may be —$OT_1$ in the second compound.

In the second compound above, $T_1$ may be a $C_1$-$C_{20}$ alkyl group; a $C_2$-$C_{20}$ alkenyl group; a $C_2$-$C_{20}$ alkynyl group; a $C_6$-$C_{12}$ cycloalkyl group; a $C_5$-$C_{20}$ aryl group; a $C_1$-$C_{20}$ alkyl group substituted with at least one substituent selected from the group consisting of —F, a hydroxyl group, and a carboxyl group; a $C_2$-$C_{20}$ alkenyl group substituted with at least one substituent selected from the group consisting of —F, a hydroxyl group, and a carboxyl group; a $C_2$-$C_{20}$ alkynyl group substituted with at least one substituent selected from the group consisting of —F, a hydroxyl group, and a carboxyl group; a $C_6$-$C_{12}$ cycloalkyl group substituted with at least one substituent selected from the group consisting of —F, a hydroxyl group, and a carboxyl group; or a $C_6$-$C_{20}$ aryl group substituted with at least one substituent selected from the group consisting of —F, a hydroxyl group, and a carboxyl group material.

For example, $T_1$ in the second compound may be a methyl group, an ethyl group, a propyl group, a butyl group, a pentyl group, a hexyl group, a heptyl group, an octyl group, an ethenyl group, a prophenyl group, a butenyl group, a pentenyl group, a hexcenyl group, a heptenyl group, an octenyl group, a acetyl group, a cyclohexyl group, a phenyl group, a pentalenyl group, an indenyl group, a naphthyl group, an azulenyl group, a heptalenyl group, an indacenyl group, an acenaphthyl group, a fluorenyl group, a phenalenyl group, a phenantlenyl group, an anthracenyl group, a fluoranthenyl group, a triphenyllenyl group, a pyrenyl group, a chrysenylenyl group, a naphthacenyl group, a picenyl group, a perylenyl group, a pentacenyl group, a hexacenyl group, a methyl group substituted by one or more —F, an ethyl group substituted by one or more —F, a propyl group substituted by one or more —F, a butyl group substituted by one or more —F, a pentyl group substituted by one or more —F, a hexyl group substituted by one or more —F, a heptyl group substituted by one or more —F, an octyl group substituted by one or more —F, an ethenyl group substituted by one or more —F, a prophenyl group substituted by one or more —F, a butenyl group substituted by one or more —F, a pentenyl group substituted by one or more —F, a hexcenyl group substituted by one or more —F, a heptenyl group substituted by one or more —F, an octenyl group substituted by one or more —F, an acetyl group substituted by one or more —F, a cyclohexyl group substituted by one or more —F, a phenyl group substituted by one or more —F, a pentalenyl group substituted by one or more —F, an indenyl group, a naphthyl group substituted by one or more —F, an azulenyl group substituted by one or more —F, a heptalenyl group substituted by one or more —F, an indacenyl group substituted by one or more —F, an acenaphthyl group substituted by one or more —F, a fluorenyl group substituted by one or more —F, a phenalenyl group substituted by one or more —F, a phenantlenyl group substituted by one or more —F, an anthracenyl group substituted by one or more —F, a fluoranthenyl group substituted by one or more —F, a triphenyllenyl group substituted by one or more —F, a pyrenyl group substituted by one or more —F, a chrysenylenyl group substituted by one or more —F, a naphthacenyl group substituted by one or more —F, a picenyl group substituted by one or more —F, a perylenyl group substituted by one or more —F, a pentacenyl group substituted by one or more —F, or a hexacenyl group substituted by one or more —F. However, the present invention is not limited thereto.

$T_1$ in the second compound may be a $C_1$-$C_{10}$ alkyl group, a $C_2$-$C_{10}$ alkenyl group, a $C_6$-$C_{14}$ aryl group, a $C_1$-$C_{10}$ alkyl group substituted with one or more —F, a $C_2$-$C_{10}$ alkenyl group substituted with one or more —F, or a $C_6$-$C_{14}$ aryl group substituted with one or more —F, but is not limited thereto.

$T_1$ in the second compound may be a methyl group, an ethyl group, a propyl group, a butyl group, a pentyl group, a hexyl group, a heptyl group, an octyl group, an ethenyl group, a prophenyl group, a butenyl group, a pentenyl group, a hexcenyl group, a heptenyl group, an octenyl group, a phenyl group, a naphthyl group, a fluorenyl group; a methyl group substituted with one or more —F, an ethyl group substituted with one or more —F, a propyl group substituted with one or more —F, a butyl group substituted with one or more —F, a pentyl group substituted with one or more —F, a hexyl group substituted with one or more —F, a heptyl group substituted with one or more —F, an octyl group substituted with one or more —F, an ethenyl group substituted with one or more —F, a prophenyl group substituted with one or more —F, a butenyl group substituted with one or more —F, a pentenyl group substituted with one or more —F, a hexcenyl group substituted with one or more —F, a heptenyl group substituted with one or more —F, an octenyl group substituted with one or more —F, a phenyl group substituted with one or more —F, a naphthyl group substituted with one or more —F, or a fluorenyl group substituted with one or more —F, but is not limited thereto.

$T_1$ may be a methyl group, an ethyl group, a propyl group, a butyl group, a pentyl group, a hexyl group, a heptyl group, an octyl group, a methyl group substituted with one or more —F, an ethyl group substituted with one or more —F, a propyl group substituted with one or more —F, a butyl group substituted with one or more —F, a pentyl group substituted with one or more —F, a hexyl group substituted with one or more —F, a heptyl group substituted with one or more —F, or an octyl group substituted with one or more —F, but is not limited thereto.

The amount of the first compound may be in the range of about 10 parts by volume to about 30 parts by volume (or of 10 parts by volume to about 30 parts by volume) based on 100 parts by volume of the total volume of the nonaqueous organic solvent, the first compound, and the second compound. The amount of the first compound may be in the range of about 20 parts by weight to about 30 parts by weight (or of 20 parts by weight to 30 parts by weight), for example, in the range of about 20 parts by weight to about 25 parts by weight (or of 20 parts by weight to 25 parts by weight) based on 100 parts by volume of the total volume of the nonaqueous organic solvent, the first compound, and the second compound. The amount of the second compound may be in the range of about 5 parts by volume to about 10 parts by volume (or of about 5 parts by volume to about 10 parts by volume) based on 100 parts by volume of the total volume of the nonaqueous organic solvent, the first compound, and the second compound. If the amount of the first compound and the amount of the second compound are within the range described above, relatively high incombustibility may be obtained without a substantial decrease in viscosity and ion conductivity of the electrolyte.

The nonaqueous organic solvent contained in the electrolyte may function as a migration medium of ions involved in electrochemical reactions of the lithium battery.

Examples of the nonaqueous organic solvent may include a carbonate solvent, an ester solvent, an ether solvent, a ketone solvent, an alcohol solvent, and an aprotic solvent.

Examples of the carbonate solvent may include carbonate materials, including dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), and butylene carbonate (BC); and a derivative thereof in which at least one hydrogen atom is substituted with —F. The derivative may include fluoroethylene carbonate (FEC) obtained by substituting hydrogen of EC with —F, but is not limited thereto. Compound 3 represented by Formula 3 below may be used as a carbonate solvent, but is not limited thereto:

$$Z_1-O-C(=O)-Z_2 \qquad \text{Formula 3}$$

$Z_1$ and $Z_2$ in Formula 3 may each independently be a $C_1$-$C_{10}$ alkyl group or a $C_1$-$C_{10}$ alkyl group substituted with one or more —F.

For example, $Z_1$ and $Z_2$ in Formula 3 may each independently be a methyl group, an ethyl group, a propyl group, a butyl group, a pentyl group, a hexyl group, a methyl group substituted with one or more —F, an ethyl group substituted with one or more —F, a propyl group substituted with one or more —F, a butyl group substituted with one or more —F, a pentyl group substituted with one or more —F, or a hexyl group substituted with one or more —F.

The ester solvent may be methyl acetate, ethyl acetate, n-propyl acetate, dimethyl acetate, methyl propionate, ethyl propionate, γ-butylolactone, decanolide, valerolactone, mevalonolactone, caprolactone, butyrate, or hexanoate, but is not limited thereto.

The ether solvent may be dibutyl ether, tetraglyme, diglyme, dimethoxy ethane, 2-methyltetrahydrofuran, or tetrahydrofuran, but is not limited thereto.

The ketone solvent may be cyclohexanone, but is not limited thereto.

The alcohol solvent may be ethyl alcohol or isopropyl alcohol, but is not limited thereto.

The aprotic solvent may be nitrile such as R—CN, wherein R is a linear, branched or cyclic $C_2$-$C_{20}$ hydrocarbon-based moiety and may include a double-bonded aromatic ring or an ether bond; amide such as dimethylformamide; dioxolane such as 1,3-dioxolane, or sulfolane, but is not limited thereto.

The nonaqueous organic solvent may be used alone or in combinations of at least two other solvents. For example, the nonaqueous organic solvent may be a solvent or a mixture of at least two solvents selected from the carbonate solvents as described above. If the nonaqueous organic solvent is a mixture of at least two solvents, a mixed ratio of the at least two solvents may be suitably varied according to the desired performance of a lithium battery.

For example, the nonaqueous organic solvent may be a mixture of EC, EMC, and FEC, but is not limited thereto.

The lithium salt contained in the electrolyte is dissolved in the nonaqueous organic solvent and functions as a source of lithium ions in the lithium battery to operate the lithium battery, and accelerates the migration of lithium ions between the positive electrode and the negative electrode.

For example, the lithium salt may be at least one supporting electrolyte salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are each independently a natural number), LiCl, Lil, and $LiB(C_2O_4)_2$ (bis(oxalato) borate (LiBOB)).

The concentration of the lithium salt may be in the range of about 0.1 M to about 2.0 M, for example, in the range of about 0.6 M to about 2.0 M. If the concentration of the lithium salt is within the range described above, the electrolyte may have desired conductivity and viscosity, and thus lithium ions may be efficiently migrated.

The electrolyte may further include an additive capable of improving low temperature performance of the lithium battery and swelling performance of the lithium battery at high temperature. For example, the additive may be vinylene carbonate (VC); VC derivatives having at least one substituent selected from the group consisting of a halogen atom (for example, —F, —Cl, —Br, and —I), a cyano (CN) group, and a nitro ($NO_2$) group; vinyl ethylene carbonate (VEC); VEC derivatives having at least one substituent selected from the group consisting of a halogen atom (for example, —F, —Cl, —Br, and —I), a CN group and a $NO_2$ group; succinonitrile (SN); succinic anhydride (SA); and propane sultone (PS), but is not limited thereto.

The additive may be used alone or in a combination of at least two different materials.

The amount of the additive may be in the range of about 0.1 parts by weight to about 10 parts by weight based on 100 parts by weight of the electrolyte. If the amount of the additive is within the range described above, low temperature performance of the lithium battery and swelling characteristics of the lithium battery at high temperature may be improved to a desired level without a decrease in incombustibility of the lithium battery.

For example, the amount of the additive may be in the range of about 1 part by weight to about 5 parts by weight (or of 1 part by weight to 5 parts by weight), or in the range of about 3 parts by weight to about 4 parts by weight (or of 3 parts by weight to 4 parts by weight), based on 100 parts by weight of the electrolyte, but is not limited thereto.

For example, the amount of the additive may be 3 parts by weight or 4 parts by weight based on 100 parts by weight of the electrolyte, but is not limited thereto.

According to another embodiment of the present invention, a lithium battery includes: a positive electrode including a positive active material; a negative electrode including a negative active material; and an electrolyte, wherein the electrolyte includes a nonaqueous organic solvent, a lithium salt, the first compound represented by Formula 1, and the second compound represented by Formula 2. The nonaqueous organic solvent, the lithium salt, the first compound, and the second compound included in the electrolyte are described more fully above. Also, the electrolyte may further include an additive. The additive is described more fully above.

The type of the lithium battery is not limited, and may be, for example, a lithium secondary battery, such as a lithium ion battery, a lithium ion polymer battery, a lithium sulfur battery, or the like, or a lithium primary battery.

The positive electrode may include a current collector and a positive active material layer disposed on the current collector. The positive electrode may be prepared according to the following process. A positive active material, a binder, and a solvent may be mixed to prepare a positive active material-containing composition. Then, the positive active material-containing composition may be directly coated on a current collector (for example, an aluminum (Al) current collector) and dried to form a positive active material layer, thereby preparing a positive electrode plate. Alternatively, the positive active material-containing composition may be cast on a separate support, and a film separated therefrom is laminated on the current collector to form a positive active material layer, thereby preparing a positive electrode plate. The positive electrode may be prepared by any suitable method, and the present invention is not thereby limited. The solvent may be N-methylpyrrolidone, acetone, water, or the like, but is not limited thereto.

A compound (lithiated intercalation compound) which allows reversible intercalation and deintercalation of lithium ions may be used as the positive active material. Examples of the first positive active material may include compounds represented by any one of the following formulae, but are not limited thereto.

$Li_aA_{1-b}X_bD_2$ (where $0.95 \leq a \leq 1.1$, and $0 \leq b \leq 0.5$); $Li_aE_{1-b}X_bO_{2-c}D_c$ (where $0.95 \leq a \leq 1.1$, $0 \leq b \leq 0.5$, and $0 \leq c \leq 0.05$); $LiE_{2-b}X_bO_{4-c}D_c$ (where $0 \leq b \leq 0.5$ and $0 \leq c \leq 0.05$); $Li_aNi_{1-b-c}Co_bB_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Co_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Co_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Mn_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aN_{i_b}E_cG_dO_2$ (where $0.90 \leq a \leq 1.1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.1$ and $0.001 \leq b \leq 0.1$); $Li_aCoG_bO_2$ (where $0.90 \leq a \leq 1.1$ and $0.001 \leq b \leq 0.1$); $Li_aMnG_bO_2$ (where $0.90 \leq a \leq 1.1$ and $0.001 \leq b \leq 0.1$); $Li_aMn_2G_bO_4$ (where $0.90 \leq a \leq 1.1$ and $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Co), and combinations thereof.

A surface coating layer may be formed on these compounds. Alternatively, a mixture of the compounds without having a coating layer thereon and the compounds having a coating layer thereon may be used. The coating layer may include at least one compound of a coating element selected from the group consisting of oxides, hydroxides, oxyhydroxides, oxycarbonates, and hydroxycarbonates of the coating element. The compounds for the coating layer may be amorphous or crystalline. The coating element contained in the coating layer may be magnesium (Mg), aluminium (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof.

The coating layer may be formed using any method, for example, a spray coating method, a dipping method, or the like, which does not adversely affect the physical properties of the positive active material when a compound of such a coating element is used.

For example, the positive active material may be represented by the formula of $LiNi_{0.5}Co_{0.2}Mn_{0.3}O_2$ and/or $LiCoO_2$, but is not limited thereto.

The binder contained in the positive active material layer functions to strongly bind positive active material particles together and to the current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer having ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The positive active material layer may further include a conducting agent. The conducting agent is used to provide conductivity to the positive electrode. Any conductive material inducing no chemical change in batteries may be used. Examples of the conducting agent may include carbonaceous materials, such as natural graphite, artificial graphite, carbon black, acetylene black, ketchen black, carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The current collector may be aluminum (Al), but is not limited thereto.

Similarly, a negative active material, a conducting agent, a binder, and a solvent may be mixed to prepare a negative active material-containing composition. The negative active material-containing composition may be directly coated on a current collector (for example, a Cu current collector), or may be cast on a separate support, and a negative active material film separated therefrom may be laminated on a Cu current collector to obtain a negative electrode plate. In this regard, the amounts of the negative active material, the conducting agent, the binder, and the solvent may be those commonly used in a lithium battery.

Natural graphite, artificial graphite, a silicon/carbon complex, silicon metal, a silicon thin film, lithium metal, a lithium alloy, a carbonaceous material, or graphite may be used as the negative active material. The conducting agent, the binder, and the solvent in the negative active material-containing composition may be the same as those in the positive active material-containing composition. If desired, a plasticizer may be further added to the positive active material-containing composition and the negative active material-containing composition to produce pores inside the electrode plates.

A separator may be interposed between the positive electrode and the negative electrode according to the type of the lithium battery. Any separator that is commonly used for lithium batteries may be used. In an embodiment, the separator may have low resistance to migration of ions in an electrolyte and have high electrolyte-retaining ability. Examples of materials used to form the separator include glass fiber, polyester, Teflon, polyethylene, polypropylene, polytetrafluoroethylene (PTFE), and combinations thereof, each of which may be a nonwoven fabric or a woven fabric. A windable separator formed of a material such as polyethylene and polypropylene may be used for a lithium ion battery. A separator that may retain a large amount of an organic electrolyte may be used for a lithium ion polymer battery. These separators may be prepared according to the following process.

A polymer resin, a filler, and a solvent are mixed to prepare a separator composition. Then, the separator composition may be directly coated on an electrode, and then dried to form a separator film. Alternatively, the separator composition may be cast on a separate support and then dried to form a separator composition film, and the separator composition film separated from the support may be laminated on an electrode to form a separator film.

The polymer resin may be any material that is commonly used as a binder for an electrode plate. Examples of the polymer resin include a vinylidenefluoride/hexafluoropropylene copolymer, polyvinylidenefluoride, polyacrylonitrile, polymethylmethacrylate, and mixtures thereof. For example, a vinylidenefluoride/hexafluoropropylene copolymer having about 8 to about 25 wt % (or having 8 to 24 wt %) of hexafluoropropylene may be used.

The separator may be interposed between the positive electrode plate and the negative electrode plate to form a battery assembly. The battery assembly is wound or folded and then sealed in a cylindrical or rectangular battery case. Then, an electrolyte is injected into the battery case to complete the manufacture of a lithium ion battery. Alternatively, a plurality of electrode assemblies may be stacked in a bi-cell structure and impregnated with an electrolyte according to an embodiment of the present invention. The resultant is put into a pouch and sealed, thereby completing the manufacture of a lithium ion polymer battery.

FIG. 1 is a schematic perspective view of a lithium battery 30 according to an embodiment of the present invention. Referring to FIG. 1, the lithium battery 30 according to the current embodiment includes a positive electrode 23, a negative electrode 22, a separator 24 interposed between the positive electrode 23 and the negative electrode 22, an electrolyte impregnated into the positive electrode 23, the negative electrode 22, and the separator 24, a battery case 25, and a sealing member 26 sealing the battery case 25. The lithium battery 30 is manufactured by sequentially stacking the positive electrode 23, the negative electrode 22, and the separator 24 upon one another, winding the stack in a spiral form, and inserting the wound stack into the battery case 25.

The existence and/or the amount of a target element contained in the electrolyte of the lithium battery to be analyzed (for example, the first compound and the second compound) may be measured by gas chromatography (GC)/mass spectroscopy (MS).

In this regard, quantitative analysis of the target element may be performed using an internal standard method (ISTD) and/or an external standard method (ESTD).

According to the ISTD, the quantitative analysis may be performed using ethyl acetate (EA) as an internal standard. According to the ESTD, the quantitative analysis may be performed using at least one standard per concentration for the target element to be analyzed (for example, the first compound and the second compound).

For example, a method of quantitatively analyzing the target element (for example, the first compound and the second compound) contained in the electrolyte of the lithium battery may include: extracting the electrolyte from the lithium battery; performing GC/MS analysis on the extracted electrolyte by using ISTD or ESTD to collect data of the target element; and calculating the amount (for example, % by weight or % by volume) of the target element from the data, but is not limited thereto.

Details of the GC/MS analysis are disclosed in "Principles of Instrumental Analysis", $5^{th}$ edition, Douglas A. Skoog, et al., pp. 701-722, and the entire content of which is incorporated herein by reference.

A standard condition for autointegration may be set to detect a peak with an initial peak width of 0.004 or above and a peak threshold of 8 or above from a spectrum obtained as a result of the GC/MS analysis on the electrolyte. Then, as a result of autointegration, a peak area ratio of the first compound to the second compound may be in the range of about 0.1 to about 2 (or in the range of 0.1 to 2). The GC/MS analysis method and result are described more fully in the following examples.

Hereinafter, one or more embodiments of the present invention will be described in more detail with reference to the following examples. However, these examples are not intended to limit the scope of the one or more embodiments of the present invention.

EXAMPLES

Example 1

Natural graphite, styrene-butadiene rubber (SBR), and carboxymethyl cellulose (CMC) were mixed in a weight ratio of 97.5:1:1.5 in N-methylpyrrolidone, as a solvent, to prepare a negative electrode slurry. The negative electrode slurry was coated on a copper (Cu)-foil to form a thin negative electrode plate having a thickness of 14 μm, dried at 135° C. for 3 hours or longer, and pressed to manufacture a negative electrode.

LiCoO$_2$, as a positive active material, carbon conductor, and polyvinylidene fluoride (PVDF), as a binder, were dispersed in a weight ratio of 96:2:2 in N-methylpyrrolidone, as a solvent, to prepare positive electrode slurry. The positive electrode slurry was coated on an aluminum (Al)-foil to form a thin positive electrode plate having a thickness of 60 on, dried at 135° C. for 3 hours or longer, and pressed to manufacture a positive electrode.

A mixture of ethylene carbonate (EC), fluoroethylene carbonate (FEC), ethylmethyl carbonate (EMC), Compound 1a (CF$_2$H—CF$_2$—CH$_2$—O—CF$_2$—CF$_2$H, fluorine atoms/hydrogen atoms=2) as the first compound, and Compound 2a (represented by Formula 2, wherein $R_1$ through $R_5$ are —F and $R_6$ is —OCH$_2$CH$_3$) as the second compound in a volume ratio of 20:5:50:20:5 was mixed with 0.5M LiPF$_6$, 0.5M LiTFSI, and 0.4% LiBF$_4$ to prepare an electrolyte.

The negative electrode and the positive electrode were wound using a porous polyethylene (PE) film (having a thickness of 18 μm), as a separator, and pressed and placed into a battery case. Then, the electrolyte was injected into the battery case to manufacture a square shaped lithium secondary battery, thereby manufacturing a lithium battery having a capacity of 1,200 mAh.

Example 2

A lithium battery was manufactured in the same manner as in Example 1, except that the volume ratio of EC, FEC, EMC, Compound 1a, and Compound 2a was adjusted to 20:5:45:20:10.

Example 3

A lithium battery was manufactured in the same manner as in Example 1, except that the volume ratio of EC, FEC, EMC, Compound 1a, and Compound 2a was adjusted to 20:5:45:25:5.

Example 4

A lithium battery was manufactured in the same manner as in Example 1, except that Compound 2b represented by Formula 2, wherein $R_1$, $R_2$, $R_4$, and $R_5$ are —F and $R_3$ and $R_6$ are —OCH$_2$CH$_3$, was used as the second compound, instead of Compound 2a, and the volume ratio of EC, FEC, EMC, Compound 1a, and Compound 2b was adjusted to 20:5:50:20:5.

Example 5

A lithium battery was manufactured in the same manner as in Example 4, except that the volume ratio of EC, FEC, EMC, Compound 1a, and Compound 2b was adjusted to 20:5:45:20:10.

Example 6

A lithium battery was manufactured in the same manner as in Example 4, except that the volume ratio of EC, FEC, EMC, Compound 1a, and Compound 2b was adjusted to 20:5:45:25:5.

Comparative Example 1

A lithium battery was manufactured in the same manner as in Example 1, except that Compound 2a was not added and the volume ratio of EC, FEC, EMC, and Compound 1a was adjusted to 20:5:55:20.

Comparative Example 2

A lithium battery was manufactured in the same manner as in Example 1, except that Compound 1a was not added and the volume ratio of EC, FEC, EMC, and Compound 2a was adjusted to 20:5:55:20.

Comparative Example 3

A lithium battery was manufactured in the same manner as in Example 4, except that Compound 1a was not added and the volume ratio of EC, FEC, EMC, and Compound 2b was adjusted to 20:5:55:20.

Evaluation Example 1

Capacity and Penetration Characteristic Evaluation

The lithium batteries manufactured according to Examples 1 through 6 and Comparative Examples 1 through 3 were charged at a constant current (CC) of 0.2 C and a constant voltage (CV) of 4.2 V at room temperature under cut-off current of 20 mA. Then, the batteries were discharged at a current of 520 mA under cut-off voltage of 2.75V. The lithium batteries were subjected to a formation process.

The lithium batteries according to Examples 1 through 6 and Comparative Examples 1 through 3, after undergoing the formation process, were charged for 10 minutes at CC of 0.5 C and a CV of 4.2V at room temperature (about 25° C.) under cut-off of 0.1 CmA. Then, the batteries were discharged for 10 minutes at a current of 0.2 mA under cut-off voltage of 2.75 V. The capacities of the lithium batteries were measured, and the results are shown in Table 1.

The lithium batteries according to Examples 1 through 6 and Comparative Examples 1 through 3 were charged at CC of 0.5 C and CV of 4.35 V at room temperature (about 25° C.) under cut-off of 0.1 CmA. Then, a nail having a thickness of 5φ was penetrated through the lithium batteries at a speed of 40 mm/s. Penetration characteristics of the lithium batteries were evaluated, and the results are shown in Table 1.

TABLE 1

|  | first compound | second compound | Capacity (mAh) | Result of penetration experiment |
|---|---|---|---|---|
| Example 1 | Compound 1a | Compound 2a | 1262 | no fire |
| Example 2 | Compound 1a | Compound 2a | 1259 | no fire |
| Example 3 | Compound 1a | Compound 2a | 1259 | no fire |
| Example 4 | Compound 1a | Compound 2b | 1262 | no fire |
| Example 5 | Compound 1a | Compound 2b | 1261 | no fire |
| Example 6 | Compound 1a | Compound 2b | 1262 | no fire |
| Comparative Example 1 | Compound 1a | — | 1262 | Explosion |
| Comparative Example 2 | — | Compound 2a | 1267 | fire |
| Comparative Example 3 | — | Compound 2b | 1266 | fire |

Referring to Table 1, unlike the lithium batteries according to Comparative Examples 1 through 3, neither explosion nor firing occurred in the lithium batteries according to Examples 1 through 6 when evaluating the penetration characteristics thereof, indicating that the lithium batteries of Examples 1 through 6 were highly safe.

Evaluation Example 2

Component Analysis of Electrolyte

Figure 2:
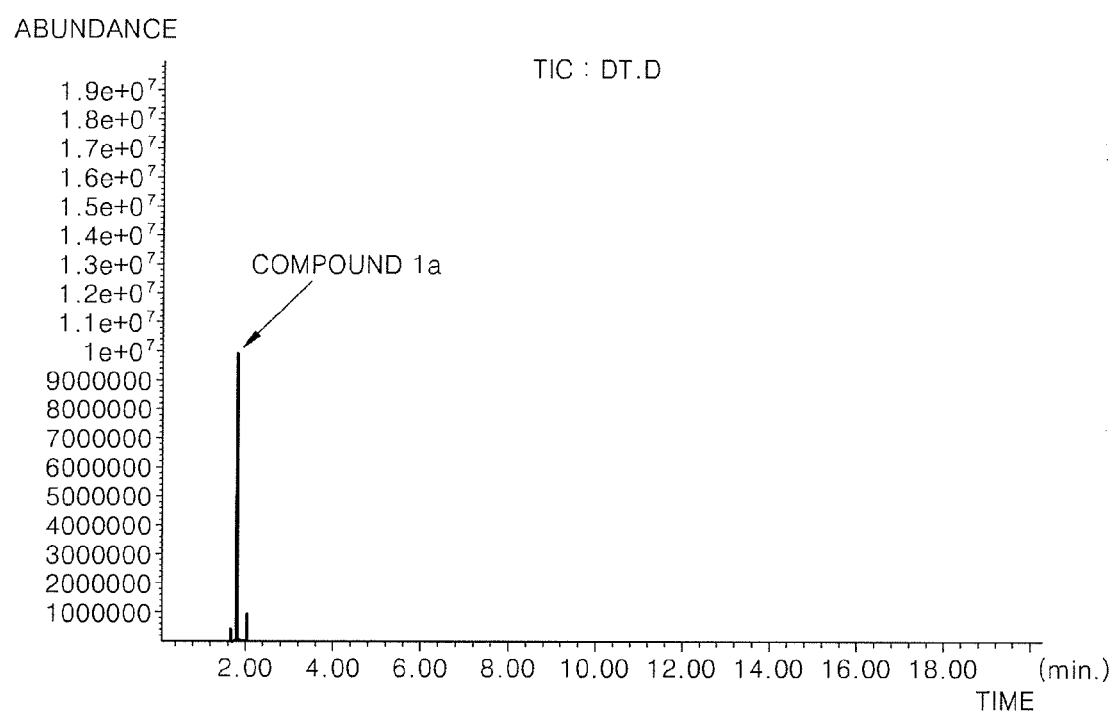
FIG. 2 is a graph showing a result of gas chromatography/mass spectrometry (GC/MS) analysis on Compound 1a used in an evaluation example.
Figure 3:
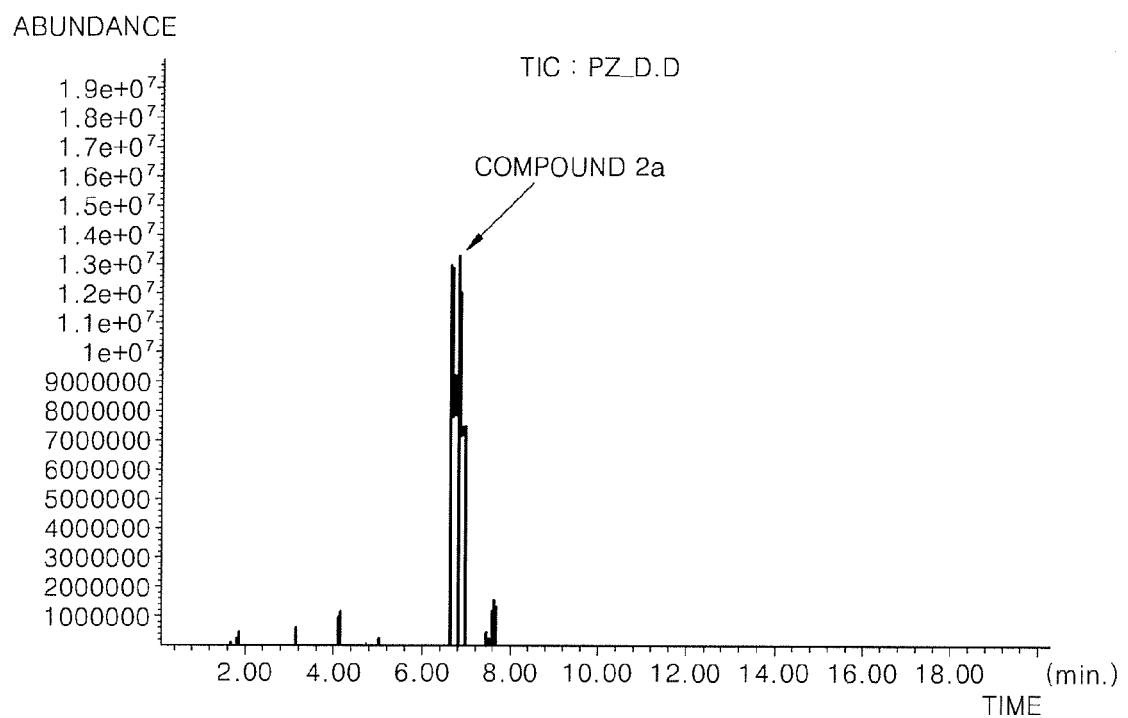
FIG. 3 is a graph showing a result of GC/MS analysis on Compound 2a used in an evaluation example.
Figure 4:
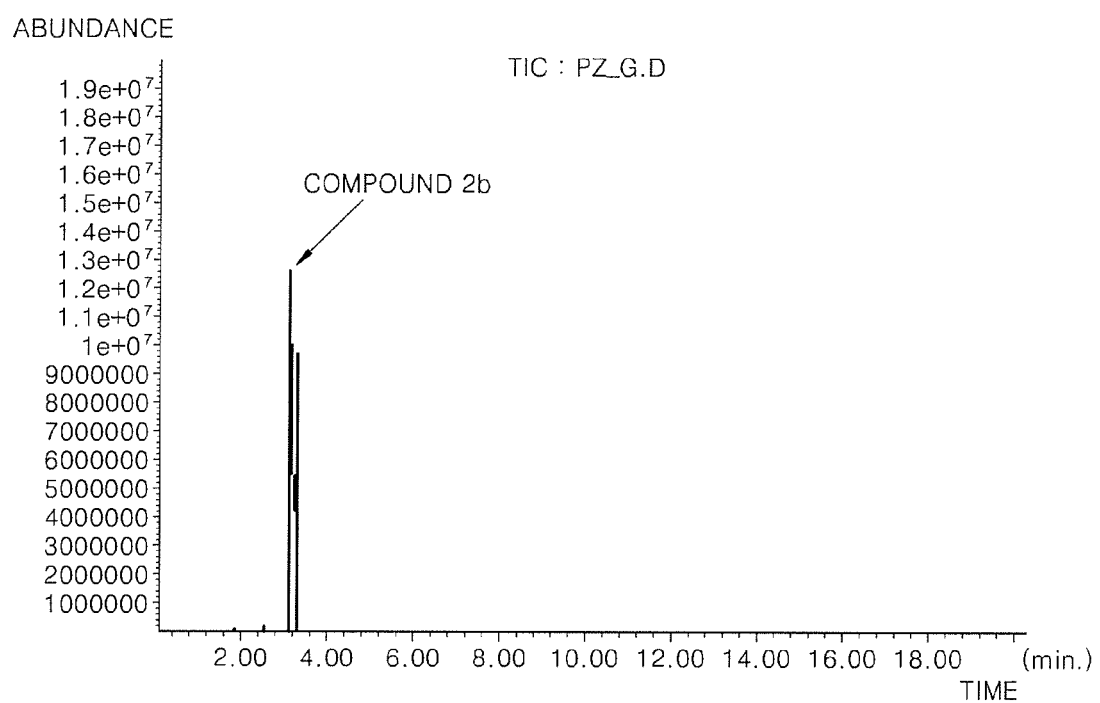
FIG. 4 is a graph showing a result of GC/MS analysis on Compound 2b used in an evaluation example.

GC/MS analysis was performed on Compound 1a, Compound 2a, and Compound 2b in the following conditions to identify peak locations of Compounds 1a, 2a and 2b, as shown in FIGS. 2, 3 and 4, respectively:
Oven temperature elevation condition: 40° C. (1 minute)-15° C./min-300° C. (2 minutes)
inlet temperature: 250° C.
inlet split ratio: 1/50
column: HP-5MS
column flow: 1 ml/min
MS source: Quadropole
MS range: 30-600

An equipment used for the GC/MS analysis was a GC-6890/Inert5973 manufactured by Agilent.

Figure 6B:
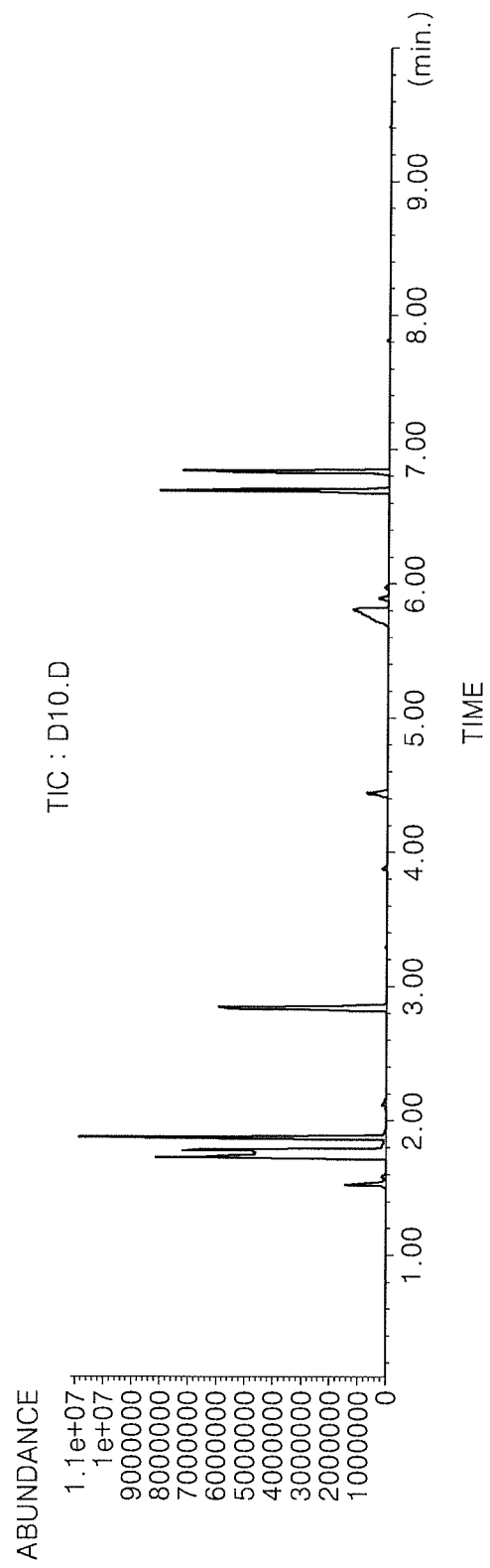
Figure 7B:
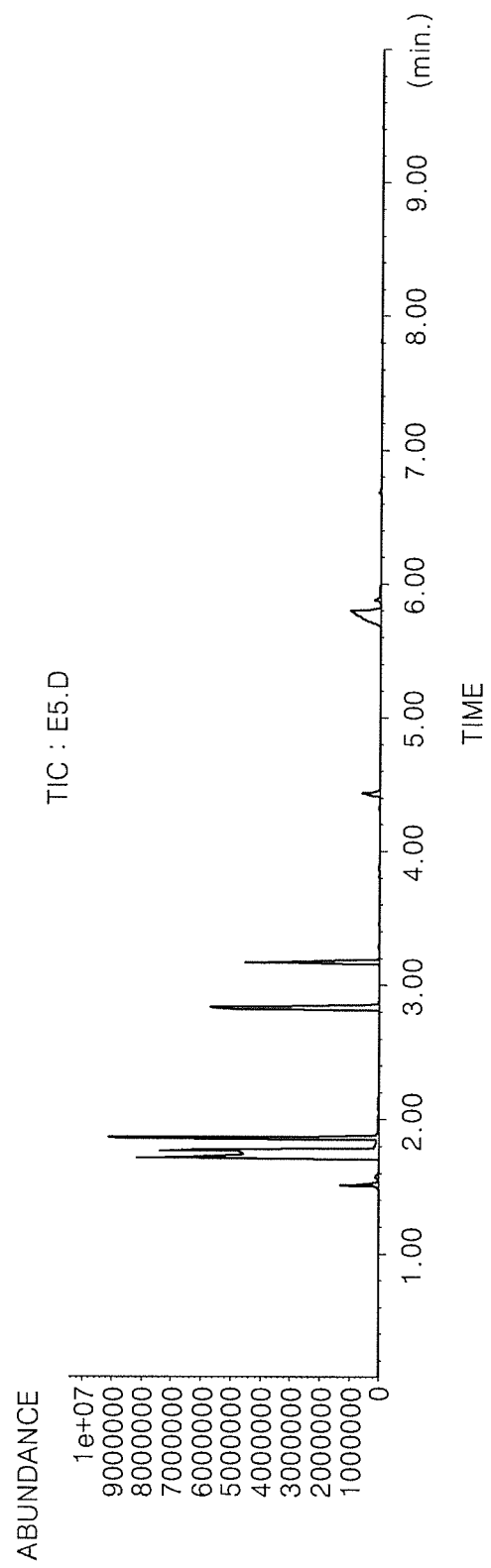
Figure 8A:
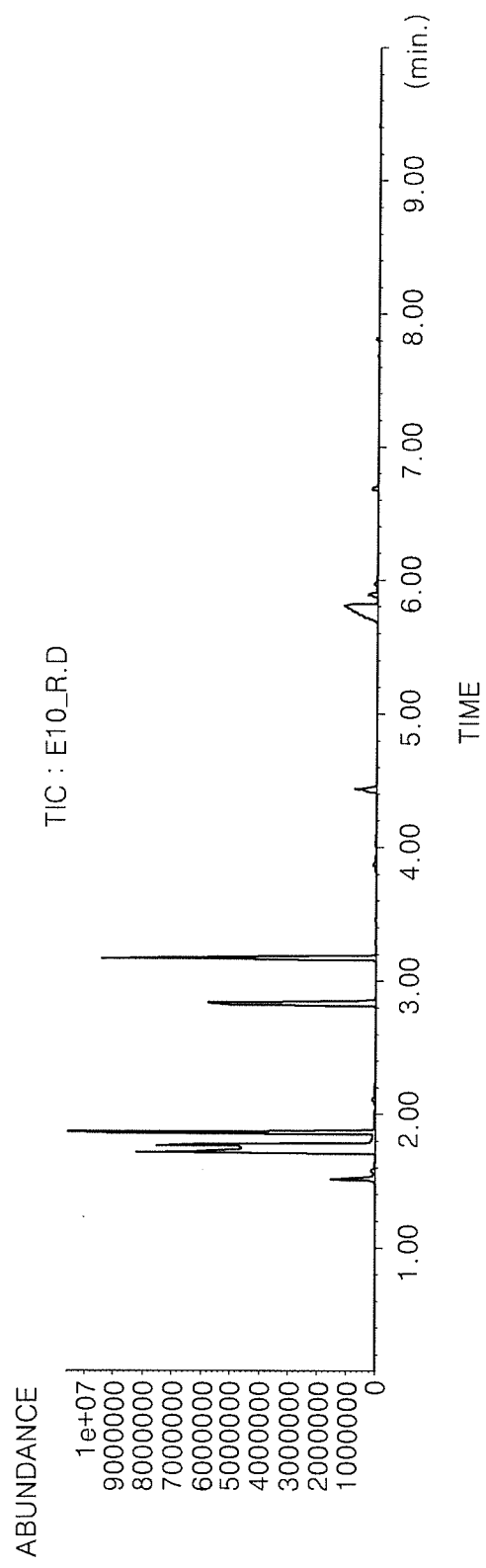
FIGS. 8A and 8B are graphs showing results of GC/MS analysis on an electrolyte included in a lithium battery of Example 5.
Figure 8B:
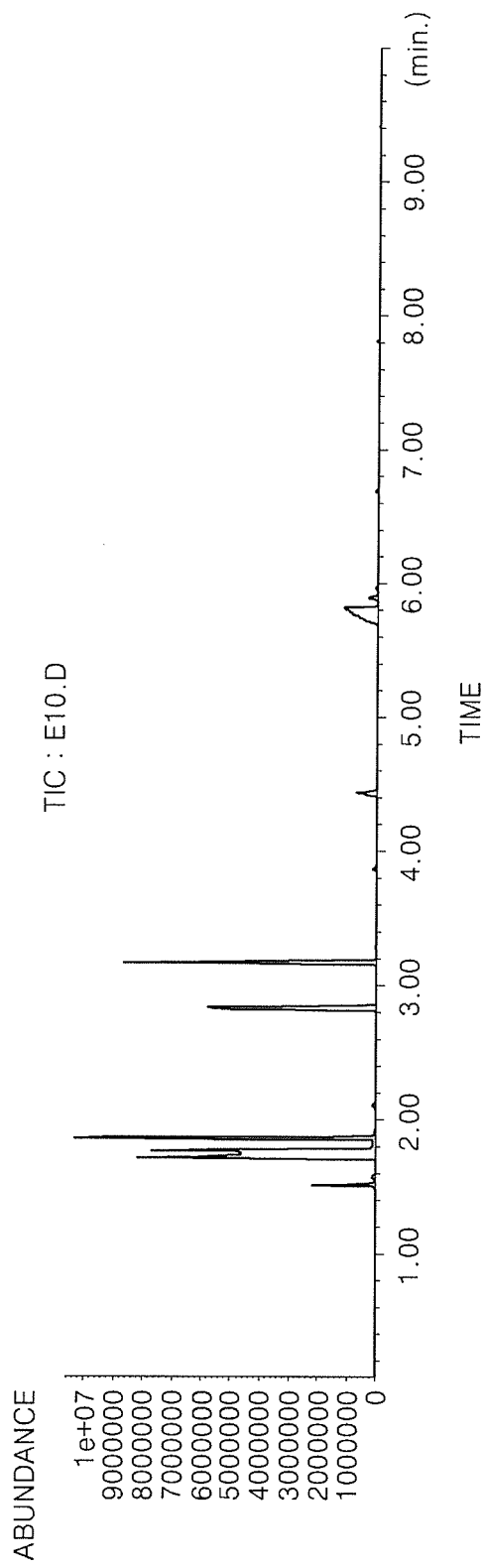

Then, the lithium batteries according to Examples 1, 2, 4, and 5 were disassembled to sample the electrolyte of each of the lithium batteries. Then, the GC/MS analysis was performed on the sampled electrolytes in the same conditions as above. The results are shown in FIGS. 5A and 5B (Example 1), FIGS. 6A and 6B (Example 2), FIGS. 7A and 7B (Example 4), and FIGS. 8A and 8B (Example 5). A standard condition for autointegration was set to detect a peak with an initial peak width of 0.004 or above and a peak threshold of 8 or above in a GC/MS analysis spectrum of each electrolyte. Then, autointergration was performed to calculate a peak area ratio of the first compound (i.e., Compound 1a) to the second compound (Compound 2a or 2b). The results are shown in Table 2.

TABLE 2

| EXAMPLE Nos.: | first compound | Volume of first compound[1] | second compound | Volume of second compound[1] | peak area of first compound/ peak area of second compound |
|---|---|---|---|---|---|
| 1 | Compound 1a | 20 parts by volume | Compound 2a | 5 parts by volume | 1.03 |
| 2 | Compound 1a | 20 parts by volume | Compound 2a | 10 parts by volume | 0.61 |
| 4 | Compound 1a | 20 parts by volume | Compound 2b | 5 parts by volume | 1.87 |
| 5 | Compound 1a | 20 parts by volume | Compound 2b | 10 parts by volume | 1.08 |

[1] parts by volume based on 100 parts by volume of the total volume of EC, FEC, EMC, the first compound and the second compound The results of the GC/MS analysis on the electrolyte of the lithium batteries according to Examples 1, 2, 4, and 5 may be confirmed from Table 2.

As described above, according to the one or more of the above embodiments of the present invention, the electrolyte may maintain its electrical characteristics such as high capacity and have excellent incombustibility. Thus, a lithium battery including the electrolyte may be highly safe.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A lithium battery comprising:
a negative electrode comprising a negative active material;
a positive electrode comprising a positive active material; and
an electrolyte,
wherein the electrolyte comprises a nonaqueous organic solvent, lithium salt, a first compound represented by Formula 1 below, and a second compound represented by Formula 2 below:

$$Q_1\text{—}O\text{—}Q_2 \qquad \text{Formula 1}$$

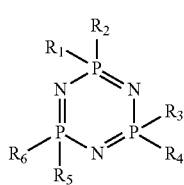

Formula 2 wherein, $Q_1$ is a $C_2$-$C_{30}$ alkyl group substituted with one or more —F;

$Q_2$ is a $C_1$-$C_{30}$ alkyl group, a $C_2$-$C_{30}$ alkenyl group, a $C_2$-$C_{30}$ alkynyl group, a $C_1$-$C_{30}$ alkyl group substituted with one or more —F, a $C_2$-$C_{30}$ alkenyl group substituted with one or more —F, or a $C_2$-$C_{30}$ alkynyl group substituted with one or more —F;

$R_1$ through $R_6$ in the second compound are each independently selected from the group consisting of —F and —$OT_1$, wherein $T_1$ is a $C_1$-$C_{30}$ alkyl group; a $C_2$-$C_{30}$ alkenyl group; a $C_2$-$C_{30}$ alkynyl group; a $C_6$-$C_{12}$ cycloalkyl group; a $C_5$-$C_{30}$ aryl group; a $C_1$-$C_{30}$ alkyl group substituted with at least one substituent selected from the group consisting of —F, a hydroxyl group, and a carboxyl group; a $C_2$-$C_{30}$ alkenyl group substituted with at least one substituent selected from the group consisting of —F, a hydroxyl group, and a carboxyl group; a $C_2$-$C_{30}$ alkynyl group substituted with at least one substituent selected from the group consisting of —F, a hydroxyl group, and a carboxyl group; a $C_6$-$C_{12}$ cycloalkyl group substituted with at least one substituent selected from the group consisting of —F, a hydroxyl group, and a carboxyl group; or a $C_5$-$C_{30}$ aryl group substituted with at least one substituent selected from the group consisting of —F, a hydroxyl group, and a carboxyl group, wherein a case where all $R_1$ through $R_6$ are —F or —$OT_1$ is excluded and the number ratio of fluorine atoms to hydrogen atoms in the first compound is 1 or above, wherein an amount of the first compound is in a range of about 10 parts by volume to about 30 parts by volume based on 100 parts by volume of a total volume of the nonaqueous organic solvent, the first compound, and the second compound, and wherein an amount of the second compound is in a range of 5 parts by volume to about 10 parts by volume based on 100 parts by volume of a total volume of the nonaqueous organic solvent, the first compound, and the second compound.

2. The lithium battery of claim 1, wherein, $Q_1$ and $Q_2$ in the first compound are each independently a methyl group substituted with one or more —F, an ethyl group substituted with one or more —F, a propyl group substituted with one or more —F, a butyl group substituted with one or more —F, a pentyl group substituted with one or more —F, a hexyl group substituted with one or more —F, a heptyl group substituted with one or more —F, or an octyl group substituted with one or more —F.

3. The lithium battery of claim 1, wherein $Q_1$ and $Q_2$ in the first compound are each independently selected from the group consisting of —$CF_2$—$CF_2H$, —$CH_2$—$CF_2$—$CF_2H$, —$CF_2$—$CF_3$, —$CH_2$—$CF_2$—$CF_3$, —$CF_2$—$CFH_2$, and —$CH_2$—$CF_2$—$CFH_2$.

4. The lithium battery of claim 1, wherein the number ratio of fluorine atoms to hydrogen atoms in the first compound is in the range of about 1 to about 10.

5. The lithium battery of claim 1, wherein, in the second compound, $R_1$ through $R_5$ are —F and $R_6$ is —$OT_1$; or wherein, in the second compound, $R_1$, $R_2$, $R_4$, and $R_5$ are —F, and $R_3$ and $R_6$ are —$OT_1$.

6. The lithium battery of claim 1, wherein, $T_1$ is a methyl group, an ethyl group, a propyl group, a butyl group, a pentyl group, a hexyl group, a heptyl group, an octyl group, a methyl group substituted with one or more —F, an ethyl group substituted with one or more —F, a propyl group substituted with one or more —F, a butyl group substituted with one or more —F, a pentyl group substituted with one or more —F, a hexyl group substituted with one or more —F, a heptyl group substituted with one or more —F, or an octyl group substituted with one or more —F.

7. The lithium battery of claim 1, wherein a peak area of the first compound/a peak area of the second compound is in the range of about 0.1 to about 2 as a result of gas chromatography (GC)/mass spectroscopy (MS) analysis.

8. An electrolyte for a lithium battery, comprising:
a nonaqueous organic solvent, a lithium salt, a first compound represented by Formula 1 below, and a second compound represented by Formula 2 below:

$$Q_1\text{—}O\text{—}Q_2 \qquad \text{Formula 1}$$

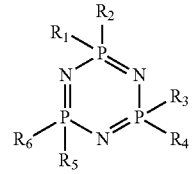

Formula 2 wherein, $Q_1$ is a $C_2$-$C_{30}$ alkyl group substituted with one or more —F;

$Q_2$ is a $C_1$-$C_{30}$ alkyl group, a $C_2$-$C_{30}$ alkenyl group, a $C_2$-$C_{30}$ alkynyl group, a $C_1$-$C_{30}$ alkyl group substituted with one or more —F, a $C_2$-$C_{30}$ alkenyl group substituted with one or more —F, or a $C_2$-$C_{30}$ alkynyl group substituted with one or more —F;

$R_1$ through $R_6$ in the second compound are each independently selected from the group consisting of —F and —$OT_1$, wherein $T_1$ is a $C_1$-$C_{30}$ alkyl group; a $C_2$-$C_{30}$ alkenyl group; a $C_2$-$C_{30}$ alkynyl group; a $C_6$-$C_{12}$ cycloalkyl group; a $C_5$-$C_{30}$ aryl group; a $C_1$-$C_{30}$ alkyl group substituted with at least one substituent selected from the group consisting of —F, a hydroxyl group, and a carboxyl group; a $C_2$-$C_{30}$ alkenyl group substituted with at least one substituent selected from the group consisting of —F, a hydroxyl group, and a carboxyl group; a $C_2$-$C_{30}$ alkynyl group substituted with at least one substituent selected from the group consisting of —F, a hydroxyl group, and a carboxyl group; a $C_6$-$C_{12}$ cycloalkyl group substituted with at least one substituent selected from the group consisting of —F, a hydroxyl group, and a carboxyl group; or a $C_5$-$C_{30}$ aryl group substituted with at least one substituent selected from the group consisting of —F, a hydroxyl group, and a carboxyl group, wherein a case where all $R_1$ through $R_6$ are —F or —$OT_1$ is excluded and the number ratio of fluorine atoms to hydrogen atoms in the first compound is 1 or above, wherein an amount of the first compound is in a range of about 10 parts by volume to about 30 parts by volume based on 100 parts by volume of a total volume of the nonaqueous organic solvent, the first compound, and the second compound, and wherein an amount of the second compound is in a range of 5 parts by volume to about 10 parts by volume based on 100 parts by volume of a total volume of the nonaqueous organic solvent, the first compound, and the second compound.

9. The electrolyte for a lithium battery of claim 8, wherein, $Q_1$ and $Q_2$ in the first compound are each independently a methyl group substituted with one or more —F, an ethyl group substituted with one or more —F, a propyl group substituted with one or more —F, a butyl group substituted with one or more —F, a pentyl group substituted with one or more —F, a hexyl group substituted with one or more —F, a heptyl group substituted with one or more —F, or an octyl group substituted with one or more —F.

10. The electrolyte for a lithium battery of claim 8, wherein, $Q_1$ and $Q_2$ in the first compound are each independently selected from the group consisting of —$CF_2$—$CF_2H$, —$CH_2$—$CF_2$—$CF_2H$, —$CF_2$—$CF_3$, —$CH_2$—$CF_2$—$CF_3$, —$CF_2$—$CFH_2$, and —$CH_2$—$CF_2$—$CFH_2$.

11. The electrolyte for a lithium battery of claim 8, wherein, the number ratio of fluorine atoms to hydrogen atoms in the first compound is in the range of about 1 to about 10.

12. The electrolyte for a lithium battery of claim 8, wherein, in the second compound, $R_1$ through $R_5$ are —F and $R_6$ is —$OT_1$; or wherein, in the second compound, $R_1$, $R_2$, $R_4$, and $R_5$ are —F, and $R_3$ and $R_6$ are —$OT_1$.

13. The electrolyte for a lithium battery of claim 8, wherein, $T_1$ is a methyl group, an ethyl group, a propyl group, a butyl group, a pentyl group, a hexyl group, a heptyl group, an octyl group, a methyl group substituted with one or more —F, an ethyl group substituted with one or more —F, a propyl group substituted with one or more —F, a butyl group substituted with one or more —F, a pentyl group substituted with one or more —F, a hexyl group substituted with one or more —F, a heptyl group substituted with one or more —F, or an octyl group substituted with one or more —F.

14. The electrolyte for a lithium battery of claim 8, wherein, the nonaqueous organic solvent comprises at least one carbonate solvent selected from the group consisting of carbonate materials from the group consisting of dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and a derivative thereof in which hydrogen is substituted with one or more —F.

15. The electrolyte for a lithium battery of claim 8, further comprising an additive selected from the group consisting of vinylene carbonate (VC); VC derivatives having at least one substituent selected from the group consisting of a halogen atom, a cyano (CN) group, and a nitro ($NO_2$) group; vinyl ethylene carbonate (VEC); VEC derivatives having at least one substituent selected from the group consisting of a halogen atom, a CN group and a $NO_2$ group; succinonitrile (SN); succinic anhydride (SA); and propane sultone (PS).

16. The electrolyte for a lithium battery of claim 8, wherein, a peak area ratio of the first compound to the second compound in a spectrum obtained by gas chromatography (GC)/mass spectroscopy (MS) analysis is in the range of about 0.1 to about 2.

* * * * *